May 25, 1954
G. B. ALEXANDER ET AL
2,679,463
PROCESS FOR PRODUCING CALCIUM-SILICON OXIDE
PIGMENT AND PRODUCT OBTAINED THEREBY
Filed Oct. 5, 1949
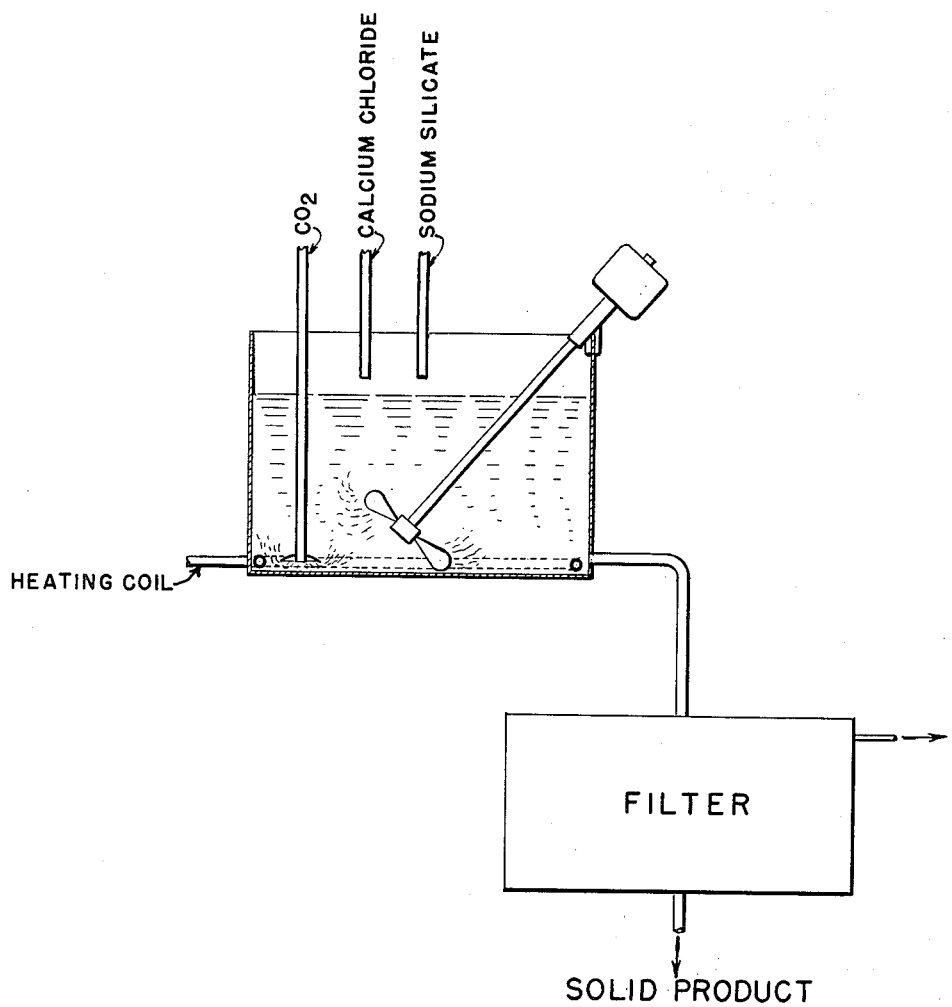
INVENTORS
Guy B. Alexander
and Ralph K. Iler
BY
Albert B. Griggs.
ATTORNEY Patented May 25, 1954

2,679,463

UNITED STATES PATENT OFFICE 2,679,463

PROCESS FOR PRODUCING CALCIUM-SILICON OXIDE PIGMENT AND PRODUCT OBTAINED THEREBY

Guy B. Alexander, Parma, and Ralph K. Iler, Cleveland Heights, Ohio, assignors to E. I. du Pont de Nemours & Company, Wilmington, Del., a corporation of Delaware Application October 5, 1949, Serial No. 119,632

9 Claims. (Cl. 106—306)

This invention relates to the preparation of finely divided calcium-silicon oxide composite products and is more particularly directed to processes wherein a soluble calcium compound, a soluble silicate, and an acid are simultaneously reacted to produce a pulverulent calcium-silicon oxide material. The invention is still further directed to the novel products produced.

It has heretofore been proposed to prepare finely divided products by the reaction of calcium chloride and sodium silicate. The products thus formed are essentially calcium silicate. Because of the high calcium content, they have high alkalinity and are, accordingly, unsuitable for inclusion in many products. They may not satisfactorily be used in inks or paints, for example, because of the tendency to react. Because of the high calcium content and high alkalinity the products form aggregates which are difficult to break down to the extremely small ultimate particles of which they are formed.

According to the present invention, silica is formed along with calcium silicate to produce a composite particle of novel character. A specific process of the invention is illustrated in the drawing which is a semi-diagrammatic representation.

Before turning to a specific embodiment of the invention the processes and products will first be described. The processes of the invention consist generally in the simultaneous reaction of a soluble calcium compound, a soluble silicate, and an acid.

The soluble silicate will ordinarily be sodium silicate though another soluble silicate such as potassium silicate may be used. The silicate may have any ratio of $SiO_2:Na_2O$ from about 0.5 to 4. It is generally preferred to use 3.25 ratio sodium silicate.

The soluble calcium compound can be any compound of calcium which is at least slightly soluble in weakly alkaline solutions. Calcium chloride is preferred but calcium hydroxide, calcium sulfamate, calcium bicarbonate, or calcium sulfate in hydrated form can be used.

The acid which is preferred is carbon dioxide. Any acid may be used if it does not form a salt of calcium which is less soluble than calcium silicate. Other suitable acids, for instance, are hydrochloric acid, sulfur trioxide, or sulfuric acid, and sulfamic acid. It will be noted that the amount of acid required will vary with different calcium compounds and if calcium bicarbonate, for instance, is used then a smaller quantity of the acid will be needed.

The proportions of the soluble calcium compound and the soluble silicate are such that the $SiO_2:CaO$ weight ratio in the products is above 4. A weight ratio from 20 to 70 is generally most desirable and specifically it is preferred to have a ratio of about 50. The reactants may be used in the proportions by weight to give the indicated weight ratio, and the products will have about the ratio calculated.

The quantity of acid used in each instance is that required to react with the soluble silicate which is not reacted with the soluble calcium compound and to give the final pH desired.

In carrying out a process of the invention the soluble calcium compound, the soluble silicate, and the acid are simultaneously mixed with vigorous agitation.

The calcium compound and the silicate will be mixed in the form of their water solutions. The calcium oxide plus silica concentration in the medium at the end of the reaction can vary from about 3 to 15 per cent by weight. The problem is one of handling. If the solutions are too dilute, then the equipment requirements become too great with no advantage. On the other hand the solutions must not be too concentrated or the final medium will be thick and hard to handle. The water can of course be present in the solution of acid as well as in the solutions of the calcium compound and the silicate. The strength of the solutions accordingly should all be so adjusted that the total amount of water relative to the calcium oxide plus silica concentration is as stated above.

In conducting processes of the invention it is desired that the reactants be mixed together rapidly and in a manner to avoid local concentrations of a reactant. The calcium compound, the silicate, and the acid may be run simultaneously into a mixing vessel which is provided with means for effecting agitation. A little water should be in the vessel at first. The three reactants, or two of them, may be added simultaneously thru a single point of entry if desired. For instance, the carbon dioxide could be used to propel the solutions of the calcium compound and the silicate thru a venturi and into a principal reacting vessel containing a volume of already reacting material. Similarly, a portion of solution may be withdrawn from the reactor and the reactants may be added to the withdrawn portion with violent agitation and returned to the principal body of reaction products. It will be apparent that still other devices for effecting rapid mixing and avoiding local concentrations can be used.

When the three reactants are added to a receptacle as described, the pH should preferably be held between 7 and 10.7. At the end of the reaction the pH is finally adjusted to between 8.5 and 10.5. The pH indicated will be obtained when the reactants are rapidly mixed in the proper proportions. The pH control can be effected by the adjustment of the amount of acid used.

The reaction can be conducted by adding the acid and the calcium compound to part or all of the silicate solution. Thus, up to about one-half of the silicate may first be introduced into a reactor and the calcium compound and acid can then be added to the silicate. After the pH falls within the range above-indicated the remainder of the silicate solution can be added simultaneously with the calcium compound and acid.

While it is not preferred, the entire quantity of sodium silicate solution can first be placed in a receptacle and the calcium compound and acid added to the silicate solution with agitation. In this event the desired pH range is not reached until towards the end of the reaction.

The process is preferably conducted at an elevated temperature, for instance, above 60° C. up to the boiling point. Pressure can be used and temperatures somewhat above boiling employed if one wishes.

The time of heating is very important. The process should ordinarily be conducted over a period of time at least as great as one-half hour. From the time that the reaction period is begun until completion of the adding of the ingredients, the temperature should be maintained between about 60° C. and the boiling point so that the reactants will be held for at least one-half hour at the temperatures indicated. If the temperature is around the boiling point and is, say, 95° C., the time is preferably from one to two hours. The reactants should be added to the reaction vessel continuously and at a moderately uniform rate over the entire period of time indicated.

At lower temperatures the reaction time should be extended and should be approximately doubled for each ten degrees below 95° C. For example, at 85 the preferred minimum of time for the addition of reactants at a uniform rate is about two hours. At seventy-five degrees the minimum time preferred is about four hours. Similarly, at 65° the minimum would be about eight hours. In each instance a time one-half as long could be used with fair results, but in no case should less than one-half hour be taken.

As has been observed, the reactants are held at an elevated temperature during the period of time of addition of reactants, and the quantities are so adjusted as to require something in excess of about a half-hour for the addition of the quantity to be reacted. After the addition of the reactants the contents of the reaction vessel should be heated and agitated for an additional period. During this holding-time the pH will rise and the agitation and heating should be continued until the pH becomes stable. Thereafter the solution may be filtered or centrifuged to separate the product.

After separation of the product from the mother liquor as by filtration, the pH can be further adjusted by washing as, for example, by washing a filter cake with dilute acid. Thus the pH can be adjusted with acid so that a one per cent dispersion in distilled water gives a pH around 9.

The products produced by processes of the invention are pulverulent and are made up of ultimate particles of about 20 to 50 millimicrons. These very small particles aggregate to form agglomerates but these agglomerates break down when they are milled into rubber or into viscous materials such as plastics.

The products are made up of particles which are a composite of calcium-silicon oxides. The precise mode of association of calcium silicate and silica in the composite particles is not understood but it is thought that the particles are substantially homogeneous. It is observed in this connection that at pH 2 and at 30° C. not more than half of the calcium is extractable with hydrochloric acid.

The products of this invention are suitable as fillers for rubber and for plastic compositions. They may be used, for instance, in phenol formaldehyde resins, in alkyd resins, in polyethylene, in polymethacrylic acid, for any of the artificial rubbers, and, in general, may be used as fillers have been used in the past for such plastic and elastic materials. It is to be observed that in using the products as fillers it will ordinarily be desirable to mill them with a viscous plastic or with a viscous component to be used in the preparation of a plastic. The products may also be used as fillers for paper-coating compositions and for coating and adhesive compositions generally.

In order that the invention may be better understood reference should be had to the following illustrative examples:

*Example 1*

The process of this example is illustrated in the drawing.

A solution of calcium chloride containing one per cent $CaCl_2$ by weight is fed into a reaction vessel which contains a small amount of water. The vessel is provided with an indirect heat exchange so that the contents can be held at a desired temperature. A mixer is provided to permit vigorous agitation of the contents of the vessel.

Simultaneously with the addition of the calcium chloride solution, sodium silicate solution is fed into the receptacle in the form of a 3.25 $SiO_2:Na_2O$ ratio solution containing three per cent by weight of $SiO_2$. Carbon dioxide is also fed simultaneously below the surface of the liquid. The components are fed at such a rate that the pH in the receiving vessel is maintained steadily at about ten. The $SiO_2:CaO$ ratio is 25 during addition and in the product. The contents of the reaction vessel are maintained at about 90° C. and the addition of the reactants is conducted over a period of ninety minutes. Heating is continued for a further period of thirty minutes after completion of the addition of the reactants. After this thirty-minute holding-time, the pH is stabilized.

The precipitate is filtered and washed. The product is white and pulverulent. It serves well as a rubber filler and as a filler for plastics such as polythene and phenolformaldehyde resins.

Example 2

The process of this example is similar to that of Example 1 but the operation is begun by adding a fourth of the total quantity of sodium silicate finally to be used directly to the receiving vessel. The calcium chloride solution and carbon dioxide are then added to the receiving vessel. The pH in the vessel slowly drops to pH 10–10.5. This addition is effected over a period of one hour. After this point is reached the remaining three-fourths of the sodium silicate is added simultaneously with the calcium chloride and carbon dioxide as in Example 1.

The addition is conducted over an additional period of three hours. After the additional is complete, the temperature of the contents of the vessel is maintained for an additional half-hour.

The product is similar to that of Example 1 but is somewhat coarser.

Example 3

A solution of a 3.25 ratio sodium silicate containing three per cent of $SiO_2$ is placed in a reaction vessel and heated to 95° C. A solution of calcium chloride containing three per cent $CaCl_2$ is added to the silicate and a stream of $CO_2$ gas is added also as in Example 1. The amount of calcium chloride is such that one mol of calcium chloride is added for every four mols of $Na_2O$ in the original sodium silicate. The quantity of $CO_2$ gas is such that about one mol of $CO_2$ is added to the system for every mol of $Na_2O$ in the sodium silicate.

The addition of calcium chloride and carbon dioxide is effected at a uniform rate and is continued over a period of about two hours. The final pH is between 10 and 10.5.

The product is white and pulverulent. After filtering, washing, and drying, it serves as a rubber filler and as a filler for plastics and as a coating agent for paper.

A portion of the product is adjusted to a lower pH by washing a portion of the filtrate with a wash water which contains traces of hydrochloric acid. Upon slurrying, the product in a one per cent dispersion in distilled water had a pH of around 9.

We claim:

1. A process for preparing a finely divided calcium-silicon oxide composite product comprising reacting simultaneously an aqueous solution of calcium chloride, an aqueous solution of sodium silicate, and carbon dioxide, the $SiO_2$:$CaO$ ratio of the reactants used being from 20 to 70, the temperature being between about 60 degrees C. and boiling, the final pH being from about 7 to 10.7, and the reactants being added to an agitated system at a uniform rate over a period of time related to the temperature and being over one hour at about 95 degrees C., and over a minimum time which is doubled for each 10 degrees C. by which the temperature selected is lower than 95 degrees C.

2. A process for preparing a finely divided calcium-silicon oxide composite product comprising reacting simultaneously a water-soluble calcium compound, a water-soluble alkali metal silicate, and an inorganic acid which does not form a salt of calcium less soluble than calcium silicate, the $SiO_2$:$CaO$ ratio being about 4, the temperature during the reaction being above 60° C., the reactants being brought together over a period of time of at least about one-half hour, and the final pH of the reactants being from 7 to 10.7.

3. A process for preparing a finely divided calcium-silicon oxide composite product comprising reacting simultaneously a water-soluble calcium compound, a water-soluble alkali metal silicate, and an inorganic acid which does not form a salt of calcium less soluble than calcium silicate, the $SiO_2$:$CaO$ ratio being from 20 to 70, the temperature during the reaction being above 60° C., the final pH of the reactants being from 7 to 10.7, and the reactants being brought together over a period of time in excess of about one-half hour.

4. A process for preparing a finely divided calcium-silicon oxide composite product comprising reacting simultaneously a solution of a water-soluble calcium compound, a solution of an alkali metal silicate, and an inorganic acid which does not form a salt of calcium less soluble than calcium silicate, the $SiO_2$:$CaO$ ratio of the reactants used being from 20 to 70, the temperature being about 95° C., the pH being maintained between 7 and 10.7, the reactants being added to an agitated system at a uniform rate for a period in excess of about one hour.

5. A process for preparing a finely divided calcium-silicon oxide composite product comprising reacting simultaneously a solution of a water-soluble calcium compound, a solution of an alkali metal silicate, and an inorganic acid which does not form a salt of calcium less soluble than calcium silicate, the $SiO_2$:$CaO$ ratio of the reactants used being from 20 to 70, the temperature being about 95° C., the pH being maintained between 7 and 10.7, the reactants being added to an agitated system at a uniform rate for a period in excess of about one hour, and holding the reacting mixture after the completion of the addition of the reactants until the pH becomes stable.

6. A process for preparing a finely divided calcium-silicon oxide composite product comprising reacting simultaneously an aqueous solution of calcium chloride, an aqueous solution of sodium silicate, and carbon dioxide, the $SiO_2$:$CaO$ ratio of the reactants used being from 20 to 70, the temperature being between about 60° C. and boiling, the pH being maintained during the reaction between 7 and 10.7 and the pH at the end of the reaction being adjusted to between 8.5 and 10.5, and the reactants being added to an agitated system at a uniform rate over a period of time related to the temperature and being over one hour at about 95° C. and over a minimum time which is doubled for each 10° C. by which the temperature selected is lower than 95° C.

7. A finely divided pulverulent calcium-silicon oxide material made up of ultimate particles about 20 to 50 millimicrons in diameter the product having an $SiO_2$:$CaO$ weight ratio above 4, not more than half the calicum being extractable with hydrochloric acid at pH 2 and at 30° C., the product having been prepared by the simultaneous strike of a water-soluble calcium compound, a soluble silicate, and an inorganic acid, which does not form a salt of calcium less soluble than calicum silicate at a temperature above 60° C.

8. A finely divided pulverulent calcium-silicon oxide material made up of ultimate particles about 20 to 50 millimicrons in diameter the product having an $SiO_2$:$CaO$ weight ratio of 20 to 70, not more than half the calcium being extractable with hydrochloric acid at pH 2 and at 30° C., the product having been prepared by the simultaneous strike of a water-soluble calcium compound, a soluble silicate, and an inorganic acid, which does not form a salt of calcium less soluble than calcium silicate at a temperature above 60° C.

9. A finely divided pulverulent calcium-silicon oxide material made by the process of claim 5 and made up of ultimate particles about 20 to 50 millimicrons in diameter, the product having an $SiO_2$:CaO weight ratio of 20 to 70, not more than half of the calcium being extractable with hydrochloric acid at pH 2 and at 30 degrees C.

References Cited in the file of this patent

UNITED STATES PATENTS

| Number | Name | Date |
|---|---|---|
| 1,715,439 | Van Nes | June 4, 1929 |
| 2,204,113 | Allen | June 11, 1940 |
| 2,237,374 | Smith | Apr. 8, 1941 |
| 2,259,481 | Mowlds | Oct. 21, 1941 |
| 2,287,700 | Muskat et al. | June 23, 1942 |
| 2,314,188 | Allen | Mar. 16, 1943 |